United States Patent [19]

Schlichting et al.

[11] 4,022,748

[45] May 10, 1977

[54] THERMOPLASTIC POLYESTER MOLDING COMPOSITIONS

[75] Inventors: Karl Schlichting, Bobenheim-Roxheim; Peter Horn, Ludwigshafen; Rolf Wurmb, Heidelberg; Claus Cordes, Weisenheim; Hans-Josef Sterzel, Ludwigshafen, all of Germany

[73] Assignee: BASF Aktiengesellschaft, Ludwigshafen, Germany

[22] Filed: Sept. 5, 1975

[21] Appl. No.: 610,651

[30] Foreign Application Priority Data

Sept. 18, 1974 Germany ......................... 2444584

[52] U.S. Cl. ............................... 260/40 R; 260/873
[51] Int. Cl.² ........................................ C08G 39/10
[58] Field of Search ......................... 260/40 R, 873

[56] References Cited

UNITED STATES PATENTS 3,969,306  7/1976  Bormon et al. ................... 260/873

Primary Examiner—Melvyn I. Marquis
Assistant Examiner—S. M. Person
Attorney, Agent, or Firm—Keil, Thompson & Shurtleff

[57] ABSTRACT

Thermoplastic polyester molding compositions showing good impact resistance at both high and relatively low temperatures and containing A. 100 parts by weight of a linear saturated polyester of an aromatic dicarboxylic acid and optionally small portions of aliphatic dicarboxylic acids with saturated aliphatic or cycloaliphatic diols and B. from 1 to 25 parts by weight of a rubber-elastic graft copolymer having a glass temperature below −20° C and C. optionally from 10 to 80 parts by weight of fillers.

6 Claims, No Drawings

THERMOPLASTIC POLYESTER MOLDING COMPOSITIONS

It is well known to form crystalline shaped articles from linear saturated polyesters of aromatic dicarboxylic acids. Of industrial significance is injection molding of polyethylene terephthalate and polybutylene terephthalate. Polybutylene terephthalate shows a much faster rate of crystallization than polyethylene terephthalate in such processes and it is therefore particularly suitable for the production of shaped articles in very short cycle times. The resulting shaped articles exhibit excellent mechanical properties for many applications, a high degree of surface hardness, good gloss and relatively good impact resistance. However, on account of the relatively high glass temperature of 75° and 60° C, the impact resistance falls relatively steeply at temperatures below 20° C. Thus for many applications it is desirable to have polyesters which are impact-resistant at relatively high and relatively low ambient temperatures. However, the other mechanical properties such as modulus for elasticity, tensile strength at yield and at break should be impaired either not at all or only to an acceptable degree.

It has been recommended in various places to improve the impact resistance of polyesters by adding other polymers. For example, German Published Application No. 1,694,173 describes the addition of copolymers of styrene and conjugated aliphatic dienes to improve the impact resistance of linear saturated polyesters of aromatic dicarboxylic acids. Other substances proposed as additives for polyesters are esters of acrylic or methacrylic acid with saturated alcohols (German Published Application No. 1,694,200), copolymers of ethylene and acrylates or methacrylates (German Published Application No. 1,694,170), copolymers of $\alpha$-olefins and vinyl esters of saturated aliphatic monocarboxylic acids (German Published Application No. 1,694,168) and mixtures of copolymers of conjugated aliphatic dienes and acrylates or methacrylates and ionic copolymers of $\alpha$-olefins and salts of $\alpha,\beta$-unsaturated acids (German Published Application No. 1,694,188).

We have now found that advantages molding compositions based on polyesters may be obtained according to the present invention. These molding compositions are characterized in that they contain A. 100 parts by weight of a linear saturated polyester of an aromatic dicarboxylic acid and optionally small portions of aliphatic dicarboxylic acids and saturated aliphatic or cycloaliphatic diols, B. from 1 to 25 parts by weight of a rubber-elastic graft polymer havign a glass temperature below $-20°$ C and C. optionally from 10 to 80 parts by weight of fillers.

It has been found, surprisingly, that molding compositions of this kind exhibit excellent impact resistance even at relatively low temperatures.

By graft copolymers we mean products obtained by polymerization of monomers in the presence of prepolymers to cause grafting of a substantial portion of the monomers onto the prepolymer molecules. The manufacture of such graft copolymers is known in principle, particular reference being made to R. J. Ceresa, "Block and graft copolymers" (Butterworth, London, 1962).

In principle, all graft copolymers are suitable for the purposes of the invention, provided they have rubber-elastic properties and their glass transition temperature is below $-20°$ C and in particular between $-150°$ and $-20°$ C and preferably between $-80°$ and $-30°$ C. Determination of the glass transition temperature may be carried out by the method proposed by B. Vollmer, "Grundriss der Makromolekularen Chemie", pp. 406 – 410, published by Springer Verlag, Heidelberg, 1962.

For example, a rubber-elastic graft copolymer suitable for use as additive in the process of the invention may be prepared starting from a prepolymer (1) which has itself been prepared from a. from 10 to 99% by weight of an acrylate of a $C_{1-15}$ alcohol, b. from 1 to 90% by weight of a monomer bearing 2 olefinic double bonds which are not conjugated and c. optionally up to 25% by weight of other monomers.

This prepolymer (1) is then grafted with the components (2), (3) and (4) described below, i.e. the components (2), (3) and (4) are polymerized in the presence of the prepolymer (1). Advantageous graft copolymers are obtained, for example, by using prepolymers (1) of a. from 10 to 99% w/w and preferably from 30 to 98% w/w and more preferably from 50 to 98% w/w of an acrylate of an alcohol having from 1 to 10 carbon atoms and preferably from 4 to 8 carbon atoms, e.g. n-butyl acrylate, octyl acrylate or ethylhexyl acrylate;

b. from 1 to 90% w/w and more preferably from 2 to 70% w/w and more preferably from 2 to 50% w/w of a monomer bearing two olefinic double bonds which are not conjugated, for example vinyl cyclohexane, cyclooctadiene-1,5 and/or esters derived from unsaturated alcohols, e.g. vinyl acrylate, alkyl acrylates, tricyclodecenyl acrylate and/or diallyl phthalate and/or c. optionally up to 25% w/w of other conventional monomers such as vinyl ethers, vinyl esters, vinyl halides, and vinyl-substituted heterocyclic compounds such as vinyl pyrrolidone (the percentages given under (a) to (c) totaling 100).

Component (b) is essential for subsequent grafting. The double bonds introduced into the prepolymer by component (b) serve (to a degree varying with the activity) as grafting sites at which further growth of the polymer molecules subsequently takes place. To such prepolymers (1) there are then grafted (per 100 parts of prepolymer):

2. from 10 to 85 parts by weight and in particular from 20 to 70 parts by weight of styrene and/or methacrylates and/or methacrylic or acrylic acid and 3. optically up to 35 parts by weight of acrylonitrile or methacrylonitrile, the amount thereof being advantageously from 10 to 15% of the styrene, and 4. optionally up to 20 parts by weight of other monomers such as acrylates, vinyl esters, vinyl ethers or vinyl halides, and vinylsubstituted heterocyclic compounds such as vinyl pyrrolidone.

It is advantageous for the graft copolymers to show a considerable content of polar groups. Advantageously, products are selected which are composed of more than 10% by weight of methacrylates or acrylates and methacrylonitrile or acrylonitrile. If the content of methacrylates or acrylates exceeds 70% by weight, it is convenient not to make use of methacrylonitrile or acrylonitrile as building block.

The manufacture of the prepolymers and of the graft copolymers is effected in conventional manner, preferably by emulsion polymerization using conventional free-radical initiators, emulsifiers and chain stoppers in aqueous emulsion or dispersion. The manufacture of suitable graft copolymers is described, e.g., in German Pat. Nos. 1,260,135 and 1,238,207.

The types mentioned in the Examples below are characterized as follows: Type A has a backbone consisting of a copolymer of n-butyl acrylate and the acrylate of tricyclodecenyl alcohol, to which branches consisting of 75% w/w styrene and 25% w/w acrylonitrile are grafted. The degree of grafting is 30% and the particle diameter of the emulsion polymer is from 200 to 400 $\mu$m. The glass temperature is from $-35°$ to 40° C.

Type B has a backbone consisting of a copolymer composed of butyl acrylate, butadiene and methyl vinyl ether. To this backbone there are grafted, at a degree of grafting of 25%, branches consisting of 70% w/w of styrene and 30% w/w of acrylonitrile. The particle diameter is from 100 to 200 $\mu$m and the glass temperature is from $-55°$ to $-60°$ C.

The graft copolymers of types A and B, when used in amounts of 0.1 to 20% and preferably from 2 to 10%, by weight, in a mixture containing polyester molding compositions, effect excellent improvement of the impact resistance even at temperatures of about $-40°$ C. It is not advantageous to add more than 20% by weight of said graft copolymers of the polyester molding compositions, since although the impact resistance is improved further, the modulus of elasticity and the tensile strength at break are reduced to such an extent that such compositions become inadequate for many applications.

The high rate of crystallization of polybutylene terephthalates is not diminished by the addition of said graft copolymers. However, it may be helpful in certain cases to add substances known to act as nucleating agents, e.g. calcium carbonate, aluminum silicates and talc. The addition of the nucleating agents may be effected at various stages in the process for manufacturing the polyester molding compositions. For example, the nucleating agent may be added during the polycondensation stage or it may be added to the polyester together with one of the graft copolymers (A) or (B) and other additives, if used.

Additional improvement in the impact resistance is achieved on both unreinforced and reinforced polyesters if diisocyanates are added to the polymer mixture in addition to said graft polymers. The content of diisocyanates may be from 0.1% to 3%, by weight. It is particularly advantageous to introduce 4,5-diphenyl methane diisocyanate.

The polyester molding compositions of the invention may also contain flameproofing additives based on elementary red phosphorus, phosphorus compounds, halogen and nitrogen compounds, antimony oxides, iron oxides, zinc oxide, dyes and pigments, stabilizers counteracting thermal, thermal-oxidative and ultraviolet attack, waxes, lubricants and processing auxiliaries to ensure trouble-free extrusion and injection molding, and also antistatic agents.

The addition of said graft polymers has also been found suitable for increasing the impact resistance of polyester molding compositions which are reinforced with fillers.

Suitable reinforcing fillers are those capable of increasing the rigidity of the polyesters. Preferred fillers are fibrous substances, particularly glass fibers of low-alkali E-glass having a fiber diameter of from 8 to 14 $\mu$ and a fiber length in the finished injection molding of from 0.1 mm to 0.5 mm. The glass fibers may be used in the form of rovings or as chopped or milled strands, which fibers may be provided with a suitable size system and an adhesion promoter or adhesive system based on silanes. The amount of reinforcing filler used is advantageously from 5 to 60% by weight and in particular from 10 to 40% by weight.

However, other fibrous reinforcing materials may be used, e.g. carbon fibers, potassium titanate monocrystal fibers, gipsum fibers, aluminum oxide fibers or asbestos. Non-fibrous such as glass spheres, hollow glass spheres or chalk, quartz and natural and calcined kaolins are also useful as are combinations of these materials with glass fibers. These fillers may, as in the case of the glass fibers, be provided with a size and/or an adhesion promoter or adhesive system.

The preferred linear saturated polyester of aromatic dicarboxylic acids is polybutylene terephthalate. It is also possible to use modified polybutylene terephthalates containing, in addition to terephthalic acid, other aromatic or even aliphatic dicarboxylic acids as basic units, e.g. naphthalene-2,6-dioic acid or adipic acid. It is likewise possible to use modified polyethylene terephthalates containing, in addition to butanediol-1,4, other aliphatic diols such as neopentyl glycol, ethylene glycol and hexanediol-1,6.

The polyesters should have a relative viscosity of from 1.44 to 1.95 and preferably from 1.50 to 1.75 dl/g (as measured on a 0.5% solution in 60:40 phenol/o-dichlorobenzene at 25° C).

Admixture of the powdered graft copolymers, which should have a water content of not more than 0.02%, may be effected by simply conveying the polyester granules and the graft copolymer and any other additives used to an extruder by way of bulk metering means, in which extruder the polymers are melted and thoroughly mixed.

On account of the surprisingly good compatibility of the graft copolymers of type A or B, it is also possible to effect mixing without previous extrusion by passing the mixture through an injection molding machine. In this case, the worm of the machine is sufficient to produce a homogeneous mixture.

The polyester molding composition should contain a minimum of moisture, preferably less than 0.02% by weight.

The proessing stability of the polyesters and particularly of polybutylene terephthalate is not detrimentally affected by the addition of the graft copolymers A or B. Extrusion and injection molding of the polymer mixture may take place between 230° and 280° C, the temperature of the mold being between 50° and 80° C.

The polyester molding compositions of the invention produce partially crystalline, dimensionally stable shaped articles which are notable for a high impact resistance even at temperatures down to $-40°$ C. The shaped articles show low moisture absorption, high solvent resistance, a very white color and high surface gloss.

EXAMPLES

The graft copolymers A or B were mixed in the proportions stated with a polyester of terephthalic acid and butanediol-1,4 having a relative viscosity of 1.65 gl/g (measured on a 0.5% solution in 60 : 40 phenol/o-dichlorobenzene at 25° C) at 240° C and the mixture is then granulated. The resulting granules were dried until the moisture content was less than 0.02%. The granules were injection molded at a mold temperature of 60° C and the plastics temperature stated to form standard specimens measuring 4×6×50 mm. The impact resistance of the said specimens was tested at various temperatures. Since specimens having standard notches as laid down in the impact resistance test using a pendulum as described in DIN 53,453 show no great differentiation in the test results so that the test is not suitable in this form, the test was modified in that a hole having a diameter of 3 mm was drilled in the centre of the 6×50 mm surface of the standard specimens so as to give a double notch. The perforated notched impact resistance ALK was then measured in cm.kg/cm$^2$ using the arrangement described in DIN 53,453. The impact was struck in the longitudinal direction of the hole, the notch effect occuring on both sides.

TABLE 1

Perforated notched impact resistance of mixtures of polybutylene terephthalate and graft copolymers at various temperatures Plastics temperature during injection molding: 240° C

| Example | Graft Type | copolymers weight% | ALK (cmkg/cm$^2$) at 23° C | 0° C | −20° C |
|---|---|---|---|---|---|
| 1 | — | — | 35 | 31 | 18 |
| 2 | A | 3 | 35 | 36 | 37 |
| 3 | A | 6 | 40 | 41 | 41 |
| 4 | A | 8 | 51 | 44 | 40 |
| 5 | B | 3 | 42 | 40 | 37 |
| 6 | B | 6 | 50 | 44 | 41 |
| 7 | B | 8 | 51 | 44 | 41 |

TABLE 2

Perforated notched impact resistance of mixtures of polybutylene terephthalate and graft copolymers at various temperatures Plastics temperature during injection molding: 260° C

| Example | Graft type | copolymers weight% | ALK (cmkg/cm$^2$) at 23° C | 0° C | −20° C | −40° C |
|---|---|---|---|---|---|---|
| 8 | — | — | 48 | — | 34 | 17 |
| 9 | A | 3 | 53 | 39 | 21 | |
| 10 | A | 6 | 57 | 42 | 26 | |
| 11 | A | 8 | 60 | 43 | 38 | |
| 12 | A | 10 | 66 | 46 | 41 | |
| 13 | A | 20 | 81 | 70 | 42 | |
| 14 | B | 3 | 53 | 38 | 20 | |
| 15 | B | 6 | 58 | 44 | 27 | |
| 16 | B | 8 | 63 | 49 | 34 | |
| 17 | B | 10 | 68 | 54 | 44 | |
| 18 | B | 20 | 84 | 83 | 56 | |

TABLE 3

Perforated notched impact resistance of mixtures of polybutylene terephthalate and graft copolymers at various temperatures Plastics temperature during injection molding: 280° C

| Example | Graft type | copolymers weight% | ALK (cmkg/cm$^2$) at 23° C | 0° C | −20° C |
|---|---|---|---|---|---|
| 19 | — | — | 24 | 21 | 19 |
| 20 | A | 3 | 28 | 25 | 23 |
| 21 | A | 6 | 32 | 33 | 33 |
| 22 | A | 8 | 35 | 35 | 32 |
| 23 | B | 3 | 28 | 24 | 21 |
| 24 | B | 6 | 31 | 28 | 25 |
| 25 | B | 8 | 36 | 31 | 27 |

We claim:
1. Thermoplastic polyester molding compositions comprising:
   A. 100 parts by weight of a linear saturated polyester of an aromatic dicarboxylic acid and
   B. from 1 to 25 parts by weight of a rubber-elastic graft copolymer having a glass temperature below −20° C said copolymer being prepared by polymerizing
      from 10 to 85 parts by weight of one or more monomers selected from the group consisting of styrene, methacrylic acid, and methacrylates,
      up to 35 parts by weight of acrylonitrile or methacrylonitrile, and
      up to 20 parts by weight of other monomers selected from the group consisting of acrylates, vinyl esters, vinyl ethers, vinyl halides, and vinyl-substituted heterocyclic compounds in the presence of 100 parts by weight of a prepolymer of
      a. from 10 to 99% by weight of an acrylate of $C_{1-15}$ alcohol, and
      b. from 1 to 90% by weight of a monomer bearing 2 olefinic double bonds, and
      c. up to 25% by weight of other monomers selected from the group consisting of vinyl ethers, vinyl esters, vinyl halides and vinyl-substituted heterocyclic compounds.

2. Thermoplastic polyester molding compositions as set forth in claim 1 and containing, as component B, a graft copolymer composed of
   a. from 30 to 77% by weight of butyl acrylate and/or ethylhexyl acrylate, from 20 to 40% by weight of butadiene, from 1 to 20% by weight of a monomer having two non-conjugated olefinic double bonds and from 3 to 30% by weight of vinyl alkyl ether having from 1 to 8 carbon atoms in the alkyl, the percentages totaling 100, which basic polymer has been obtained by polymerizing the monomers in aqueous solutions and to which
   b. from 10 to 50% by weight, based on (a), of styrene or a mixture of styrene and acrylonitrile containing up to 30% by weight of acrylonitrile has been graft-polymerized in emulsion.

3. Thermoplastic polyester molding compositions as set forth in claim 1 and containing, as component B, a graft copolymer composed of
   a. from 99 to 80% by weigth of at least one acrylate of an alcohol of from 4 to 8 carbon atoms and from 1 to 20% by weight of the acrylate of tricyclodecenyl alcohol or other monomers having at least two separate olefinic double bonds, which basic polymer has been produced by polymerizing the monomers in aqueous emulsion and to which
   b. from 10 to 50% by weight, based on (a), of styrene or a mixture of styrene and acrylonitrile containing up to 40% by weight of acrylonitrile, has been graft-polymerized in emulsion.

4. Thermoplastic polyester molding compositions as set forth in claim 1 and containing, as fillers, glass fibers having a diameter of from 8 to 14 $\mu$m and a length of from 0.01 to 0.5 mm, glass spheres, potassium titanate monocrystalline fibers or asbestos.

5. Thermoplastic polyester molding compositions as set forth in claim 1 and containing flame-retardant chlorine-containing and/or bromine-containing additives together with antimony oxide, iron oxide or zinc oxide.

6. Thermoplastic polyester molding compositions as set forth in claim 1 and containing flame-retardant additives based on red phosphorus or phosphorus compounds.

* * * * *

UNITED STATES PATENT AND TRADEMARK OFFICE
CERTIFICATE OF CORRECTION

PATENT NO. : 4,022,748

DATED : May 10, 1977

INVENTOR(S) : Karl Schlichting et al.

It is certified that error appears in the above-identified patent and that said Letters Patent are hereby corrected as shown below:

In the Heading, insert

-- References Cited, United States Patents

| | | | |
|---|---|---|---|
| 3,644,267 | 2-1972 | Jackson et al ............260-873 | (x) |
| 3,644,574 | 2-1972 | Jackson et al ............260-873 | |
| 3,671,487 | 6-1972 | Abolins ................260-873 | (x) |
| 3,830,878 | 8-1974 | Kato et al .............260-873 | (x) |
| 3,852,394 | 12-1974 | Kubota et al ............260-873 | |

--

Signed and Sealed this

Twenty-second Day of November 1977

[SEAL]

Attest:

RUTH C. MASON
Attesting Officer

LUTRELLE F. PARKER
Acting Commissioner of Patents and Trademarks